US009476804B1

United States Patent
Van Slett

(10) Patent No.: US 9,476,804 B1
(45) Date of Patent: Oct. 25, 2016

(54) PNEUMATIC DROP TEST METHOD AND APPARATUS FOR USE WITH LIFTS AND WORK CAGES IN WIND TURBINE TOWERS

(71) Applicant: AVANTI WIND SYSTEMS, INC., New Berlin, WI (US)

(72) Inventor: Andrew M Van Slett, Hartland, WI (US)

(73) Assignee: Avanti Wind Systems, Inc., Franklin, WI (US)

( * ) Notice: Subject to any disclaimer, the term of this patent is extended or adjusted under 35 U.S.C. 154(b) by 313 days.

(21) Appl. No.: 14/082,898

(22) Filed: Nov. 18, 2013

Related U.S. Application Data

(60) Provisional application No. 61/727,180, filed on Nov. 16, 2012.

(51) Int. Cl.
*G01P 3/00* (2006.01)
*G01M 99/00* (2011.01)

(52) U.S. Cl.
CPC .................................. *G01M 99/007* (2013.01)

(58) Field of Classification Search
CPC ........ H01H 85/30; H01H 85/32; B66B 1/46; B66B 9/022; B66B 9/187; B66B 9/16; B66B 5/027; B66B 5/06; B66B 5/044
USPC ........... 73/509; 361/391, 393, 628; 187/223, 187/239, 141, 142, 250, 251, 242, 247, 240, 187/243, 244, 262
See application file for complete search history.

(56) References Cited

U.S. PATENT DOCUMENTS

| | | | | |
|---|---|---|---|---|
| 3,942,607 A * | 3/1976 | Sobat | ........................ | B66B 5/22 187/373 |
| 4,556,129 A * | 12/1985 | Martin | .................... | B66F 17/00 187/279 |
| 5,379,655 A * | 1/1995 | Yeakle | .................... | B66F 7/065 187/269 |
| 8,181,748 B2 * | 5/2012 | Christensen | ............ | E02D 27/42 187/245 |
| 2003/0213655 A1* | 11/2003 | St-Germain | ............ | B66B 7/027 187/406 |
| 2008/0190706 A1* | 8/2008 | Franklin | ................. | B66B 9/027 187/251 |
| 2009/0266648 A1* | 10/2009 | Asensio Bazterra | ... | B66B 9/022 187/270 |
| 2009/0294219 A1* | 12/2009 | Oliphant | ................. | B66B 9/187 187/242 |
| 2010/0310375 A1* | 12/2010 | Hanisch | .................. | F03D 1/003 416/146 R |
| 2011/0266096 A1* | 11/2011 | Nies | .......................... | B66B 9/16 187/251 |
| 2013/0228397 A1* | 9/2013 | Horn | ......................... | E04G 3/28 182/141 |
| 2013/0289769 A1* | 10/2013 | Park | ........................ | F03D 1/001 700/259 |
| 2013/0341122 A1* | 12/2013 | Maurer | .................. | B66B 9/022 182/3 |

* cited by examiner

*Primary Examiner* — Helen Kwok
(74) *Attorney, Agent, or Firm* — Joseph S. Heino

(57) ABSTRACT

An apparatus and method for testing a lift in the tower of a wind turbine comprising a pneumatic fixture that is placed in the tower and attached to the lift. The pneumatic fixture has a pneumatic cylinder which is attached to the floor. In one embodiment, the cylinder is attached to the strap which is attached to the lift. In another embodiment, the cylinder is attached directly to the lift. The claimed method is a method for testing the safety breaking system in the lift using the pneumatic fixture.

7 Claims, 1 Drawing Sheet

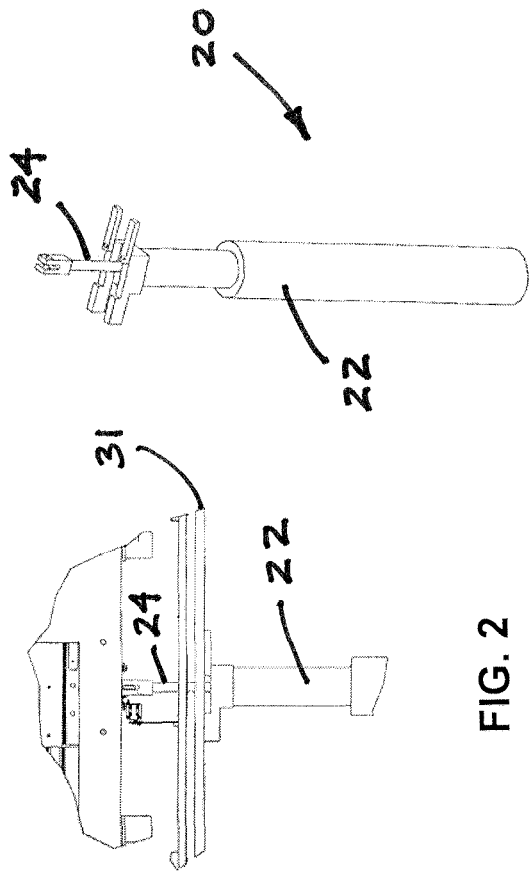
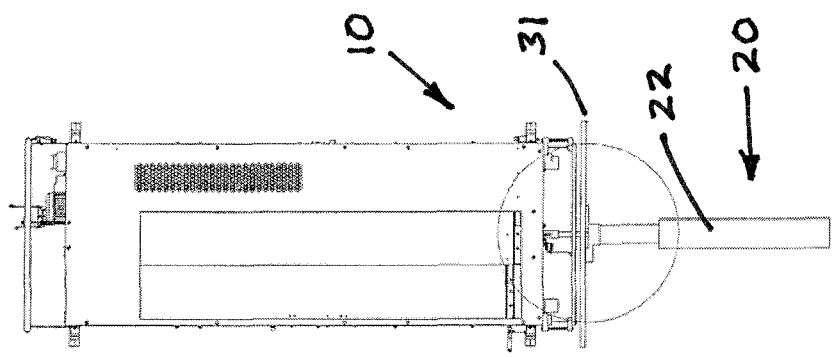
FIG. 3
FIG. 2
FIG. 1

PNEUMATIC DROP TEST METHOD AND APPARATUS FOR USE WITH LIFTS AND WORK CAGES IN WIND TURBINE TOWERS

This Application claims the benefit of U.S. Provisional Application No. 61/727,180, filed Nov. 16, 2012.

FIELD OF THE INVENTION

The present invention relates generally to wind turbine towers. It also relates generally to lifts and work cages that are used in such towers to raise and lower service personnel within such towers and to the methods that are used to maintain the safe operation of such lifts and work cages. More specifically, it relates to an improved method and apparatus that is used in the "drop" testing of lifts and work cages used in such towers, which testing increases safety of the work cages as well as the safety of service personnel who rely on such work cages to safely raise and lower themselves within such wind turbine towers.

BACKGROUND OF THE INVENTION

The use of wind turbines for converting wind energy to electrical energy is becoming more and more popular as we move toward alternative energy sources. Wind turbines of current design are typically mounted atop towers so as to place the turbines in optimal locations for receiving wind energy. As wind turbines get higher and higher, the demand for insuring the safety of employees working daily in the nacelle of the tower of the wind turbine also gets higher. Indeed, such towers are now constructed to heights of 60 meters or more. Maintenance of the wind turbine which is mounted at the top of such a tower requires that service personnel ascend the interior of the tower structure in one of two ways. The first way is to manually ascend the tower using a ladder system that is situated within the tower. The second way is to use a work cage that is electro-mechanically operable, much like an elevator, to move upwardly and downwardly within the nacelle or tower. In areas where several wind turbine towers are located, such as on a wind turbine "farm," a service technician may be required to ascend and descend several towers during a single work cycle. Experience shows that service technicians perform better quality service when they are transported in a lift or work cage as opposed to when they have to climb 60 to 100 meters up the wind turbine using the ladder. To insure that such lifts are safely and regularly maintained, certain safety mechanisms and testing methods are mandated by state and federal worker safety laws and standards. One such testing method is required for use with work cages and is referred to in the relevant art as the conventional "drop" test.

The drop test that is currently used with wind tower work cages is a time-consuming and arduous process which requires that weights be physically carried up ladders and hoisted into lifts that are situated above a landing or platform. Depending on the tower design, some platforms start at 10 meters up into the tower. Also, the weights that are to be placed are required to be provided at 125 percent of the maximum weight capacity of the work cage, or about 300 kilograms. The work cage is then raised approximately 1 meter from a landing and then dropped. Prior to this type of testing, the centrifugal brake must be removed from the motor/gearbox, which is also time-consuming. During the testing, maximum speed and drop distance is recorded. Following the testing, the centrifugal brake must be placed back into the motor/gearbox and the weights physically removed from the cage and then from the tower.

In the experience of these inventors, there is a need for an improved drop test method and apparatus which would eliminate the need to physically hoist, place and then remove test weights from the tower. It has been found that movement of 300 kilograms of "dead" weight within the turbine is unsafe. Further, all towers require that the weights be carried up steps and some towers require that weights be carried up 10 meter ladders. The weights create both pinch and strain risks and injuries have resulted from the movement of such weights. It is also expensive to transport such weights. In some instances, multiple vehicles are required to transport the weights, particularly where the towers are located in rural areas. Road conditions can result in delays in testing and the weights are also expensive to ship. Lastly, the movement of such weights increases inspection time. There is also a need to provide such an improved drop test where the time that would normally be required to perform the complete test is substantially reduced.

SUMMARY OF THE INVENTION

In accordance with the foregoing, the present invention provides an improved pneumatic drop test method and apparatus for use with lifts and work cages in the type of wind turbine towers discussed above. The improved method comprises the steps of removing the centrifugal brake from the motor/gear box. A pneumatic fixture is placed in the tower and attached to the lift. The fixture has a pneumatic cylinder comprising a cylinder barrel and a piston rod. The cylinder barrel is attached to the floor beneath the lift. The cylinder rod is attached either directly to the to the lift or to the lift via a strap. The testing then commences without the need for testing personnel to use or move weights around because this method and device eliminates the need to physically hoist, place and then remove test weights from the tower, which increases safety for the test personnel and eliminates many of the difficulties and expense associated with the current testing method. Further, the time that would normally be required to perform the complete test is greatly reduced.

The foregoing and other features of the improved safety test method and apparatus of the present invention will be apparent from the detailed description that follows.

BRIEF DESCRIPTION OF THE DRAWINGS

FIG. 1 shows a side elevational view of a lift, or work cage, of the type that uses the method and apparatus of the present invention.

FIG. 2 shows a side elevational view of the bottom of the lift, or work cage that shows a more detailed view of one embodiment of the attachment means used in the invention.

FIG. 3 shows a front and side perspective view of the cylinder employed in one embodiment of the invention.

DETAILED DESCRIPTION OF THE INVENTION

The present invention provides an improved pneumatic drop test method and apparatus for use with lifts or work cages that are used to raise and lower service personnel in wind turbine towers. It is to be understood that the method and apparatus of the present invention can be used with any of the various types of lifts and work cages that are manufactured and installed in wind towers and the precise model of lift or cage is not a limitation of the present invention.

As alluded to previously, the steps of the traditional drop test include first removing the centrifugal brake from the motor/gear box. Next, 125 percent of the maximum weight capacity of the work cage is physically placed into the work cage. FIG. 1 shows such a work cage 10. This requires that weights be moved and raised into position, typically by physically carrying them up ladders and then hoisting them into the lift. The work cage 10 is then lifted approximately one meter from the landing.

At this point, it is to be noted that the safety brakes that are tested in accordance with the present invention are electromagnetic spring-loaded brakes which engage automatically on either the releasing of the direction selector or on power failures. In the conventional testing, the electrical safety brake functions of the system are tested which is to fix a mechanism to the safety brake in order to bypass it. Next, the distance from the base of the lift 10 to the base deck is measured and recorded. A first technician holds a tachometer to the face of the lift 10. A second technician, from inside the lift 10, raises the emergency descent pin, thus allowing the lift 10 to drop. During this step, the first technician records the maximum speed achieved during the drop test and also records the distance from the base of the lift 10 to the base deck (not shown) and records the drop distance. The second technician resets the electrical safety brake, raises the lift 10 and readies the safety brake for the same testing. Upon completion of the drop testing, state inspectors are provided with the test data, the centrifugal brake is placed back into the motor/gear box and the testing weights are removed from the cage 10 and the tower. In the experience of these inventors, the entire testing of a single lift 10 may take anywhere from over an hour and a half to five hours, depending on different factors such as the tower design and the condition of the centrifugal brake, among other things.

The improved method in accordance with the present invention starts with the same step of removing the centrifugal brake from the motor/gear box of the lift 10. No weights are used, however, which dramatically reduces the time of the testing. In all, testing in accordance with the present invention can take anywhere from a little over an hour to roughly an hour and a half in the experience of these inventors. Further, no risk of injury exists, which is not the case with the traditional testing as described above. In the present invention, a pneumatic fixture is placed in the tower. A pneumatic fixture 20 comprises a cylinder barrel 22 and a cylinder rod 24. The cylinder barrel 22 is attached to any convenient surface 31 below the lift 10 such as a floor or a landing within the tower. I one embodiment, the retractable cylinder rod 24 is attached to a strap (not shown) which is placed around the lift 10. In another embodiment, the retractable cylinder rod 24 is attached directly to the lift 10 as shown in FIG. 2. In testing, for example, the lift is raised and the pneumatic fixture 20 is used to place 125 percent of the maximum rated weight capacity onto the work cage 10 by charging the pneumatic fixture 20 of the pneumatic fixture to 80 PSI, which results in a downward load of 300 kilograms. The work cage 10 is elevated to a position that is about one meter above the landing (not shown). From this point forward, the steps of the method of the present invention are essentially the same as those used in the conventional testing as described above.

Lastly, in testing related to the method of the present invention, it has been shown that (a) both the method of the present invention and the conventional testing method apply the same load; (b) the drop distance is similar; and (c) the maximum speed is similar. Thus, the basic testing is essentially the same, but the methodology is greatly improved.

In accordance with the foregoing, it will be appreciated that there has been provided a new and useful pneumatic drop test method and apparatus for use with work cages used in wind turbine towers. The improved method comprises the step of placing a pneumatic fixture is placed in the tower and secured or below or floor or landing under the lift and attaching to the lift. The testing then commences without the need for testing personnel to use or move weights around and eliminates the need to physically hoist, place and then remove test weights from the tower, which increases safety for the test personnel and eliminates many of the difficulties and expenses associated with the current testing method. Further, the time that would normally be required to perform the testing is greatly reduced.

The details of the invention having been disclosed in accordance with the foregoing, I claim:

1. A pneumatic drop test method for use with a lift or work cage used in a wind turbine tower, the tower comprising a floor disposed below the lift or work cage, the method comprising the steps of:
   placing a pneumatic fixture comprising a cylinder barrel and a pneumatically actuated cylinder rod in the tower;
   attaching the cylinder barrel to a fixed object below the lift or work cage;
   attaching the pneumatically actuated cylinder rod to the lift or work cage;
   elevating the lift or work cage to a height above the floor;
   using the pneumatic fixture to place a downward force on the lift or work cage that is in excess of a maximum rated weight capacity of the lift or work cage;
   raising an emergency descent pin to allow the lift or work cage to drop; and
   recording a maximum speed achieved during the drop.

2. The drop test method of claim 1 wherein the lift or work cage is provided with a centrifugal brake which normally engages automatically upon sensing a drop condition and the method further comprises the step of removing the centrifugal brake.

3. The drop test method of claim 1 wherein the lift or work cage further comprises a mounting point and a first end of the pneumatic fixture is adapted to be removably attached to the mounting point of the lift or work cage.

4. The drop test method of claim 1 wherein the pneumatic fixture is operable to place a load on the lift or work cage of approximately 125% of the rated capacity of the lift or work cage.

5. A pneumatic drop test apparatus for use with a lift and work cage, the apparatus comprising:
   a pneumatically actuated fixture comprising a cylinder barrel and a pneumatically actuated cylinder, the cylinder barrel being removably attachable to a fixed surface below to the lift or work cage; and the pneumatically actuated cylinder being attached to a base of the lift or work cage and being operable to place a downward force on the lift or work cage in excess of a rated capacity of the lift or work cage.

6. The pneumatic drop test apparatus of claim 5 wherein a pneumatic cylinder first end of the the pneumatically actuated fixture is adapted to be directly attachable to the a mounting point of the lift or work cage via a pin assembly.

7. The pneumatic drop test apparatus of claim 5, wherein a pneumatically actuated cylinder is operable to place a load on the lift or work cage of approximately 125% of the rated capacity of the lift or work cage.

\* \* \* \* \*